United States Patent [19]
Kawabe et al.

[11] Patent Number: 5,586,734
[45] Date of Patent: *Dec. 24, 1996

[54] SPINNING REEL HAVING AN ANTI-REVERSE MECHANISM

[75] Inventors: Yuzo Kawabe, Izumi; Noboru Sakaguchi, Tondabayashi, both of Japan

[73] Assignee: Shimano Inc., Osaka, Japan

[ * ] Notice: The term of this patent shall not extend beyond the expiration date of Pat. No. 5,547,140.

[21] Appl. No.: 400,071

[22] Filed: Mar. 7, 1995

Related U.S. Application Data

[62] Division of Ser. No. 59,672, May 12, 1993, Pat. No. 5,547,140.

[30] Foreign Application Priority Data

May 13, 1992 [JP] Japan ................... 4-31071 U

[51] Int. Cl.⁶ ............... A01K 89/02; F16D 55/02
[52] U.S. Cl. ............... 242/247; 242/299; 188/71.2
[58] Field of Search ............... 242/247, 243, 242/298, 299, 300, 244, 248; 188/71.2

[56] References Cited

U.S. PATENT DOCUMENTS

| | | | |
|---|---|---|---|
| 1,870,532 | 8/1932 | Schuetz | 188/71.2 |
| 4,529,142 | 7/1985 | Yoshikawa | 242/243 |
| 4,614,314 | 9/1986 | Ban | 242/300 X |
| 5,020,738 | 6/1991 | Yamaguchi | 242/247 X |
| 5,042,741 | 8/1991 | Aota | 242/247 X |
| 5,221,057 | 6/1993 | Yoshikawa | 242/247 |
| 5,246,168 | 9/1993 | Sugawara | 242/300 X |

FOREIGN PATENT DOCUMENTS

| | | | |
|---|---|---|---|
| 440231 | 8/1991 | European Pat. Off. | |
| 3047379 | 12/1981 | Germany | 242/243 |
| 55-38380 | 9/1980 | Japan | |
| 64-38963 | 3/1989 | Japan | |

*Primary Examiner*—Michael R. Mansen
*Attorney, Agent, or Firm*—Dickstein Shapiro Morin & Oshinski LLP

[57] ABSTRACT

A spinning reel has a rotor mounted forwardly of a reel body, and an anti-reverse mechanism for preventing the rotor from rotating in a line unwinding direction. The anti-reverse mechanism includes teeth formed on an element rotatable with the rotor, and a stopper engageable with the teeth. When a force is applied to the rotor in the line unwinding direction, a brake mechanism applies a braking force to rotation of the rotor through a one-way clutch mechanism while allowing the rotation until the stopper engages one of the teeth. The anti-reverse mechanism also includes a switching member operable to switch the stopper between a position engageable with the teeth and a position retracted from the teeth. A release mechanism cancels the braking force in response to an operation the switching member to retract the stopper from the teeth.

11 Claims, 8 Drawing Sheets

SPINNING REEL HAVING AN ANTI-REVERSE MECHANISM

This application is a divisional of application Ser. No. 08/059,672 filed May 12, 1993, now U.S. Pat. No. 5,547,140.

BACKGROUND OF THE INVENTION

1. Field of the Invention

This invention relates to spinning reels. More particularly, the invention relates to a spinning reel having an anti-reverse mechanism including teeth formed on a rotor mounted forwardly of a reel body or on an element rotatable with the rotor, and a stopper engageable with the teeth to prevent the rotor from rotating in a line unwinding direction without interfering with a rotation when said rotor is rotating in a line winding direction; and a one-way clutch mechanism of a rolling type for acting on the rotor or the element rotatable with the rotor to allow the rotor to rotate in a line winding direction.

2. Description of the Related Art

Many of the conventional spinning reels as noted above employ a ratchet wheel type anti-reverse mechanism having a stopper engageable with teeth of a wheel. With this type of anti-reverse mechanism, a rolling type one-way clutch mechanism, which is one of non-pawl types, is also used in order to eliminate play in a direction of rotation (see Japanese Utility Model Publication Kokai No. 64-38963, for example).

In use of a spinning reel in an actual situation for fishing certain types of fish, the angler often maintains the fishing line relaxed before a strike is felt and, upon a strike, attempts to hook the fish by swinging the rod. In this fishing mode, the anti-reverse mechanism or one-way clutch mechanism prevents unwinding of the fishing line, thereby to apply a tension to the fishing line, during the rod swinging operation.

Thus, the anti-reverse mechanism or one-way clutch mechanism has a function to prevent unwinding of the fishing line. A relatively heavy load acts on the anti-reverse mechanism or one-way clutch mechanism when struggling with a large fish with a drag mechanism allowed to slip.

Where the anti-reverse mechanism comprises the ratchet wheel type, the play in the direction of rotation results not only in a delay in hooking timing but in an intense shock occurring at a hooking time. It is therefore desirable to provide the rolling type one-way clutch mechanism as noted above.

However, while the rolling type one-way clutch mechanism has the advantage of allowing little or no play, the known structure noted above lacks in strength since the rollers have small areas of contact with a shaft or an outer race. Consequently, the one-way clutch mechanism could be damaged when a strong hooking operation is carried out in an attempt to catch a large fish. There is room for improvement.

Commercially available one-way clutch mechanisms capable of withstanding a relatively heavy load as noted above have large radial dimensions. Such one-way clutch mechanisms would render reels large and heavy, and are not suited for practical use.

SUMMARY OF THE INVENTION

The object of the present invention is to provide a spinning reel which is compact while retaining the advantage of using a rolling type one-way clutch mechanism, and is capable of reliably preventing unwinding of a fishing line and operating a brake mechanism in an effective way.

The above object is fulfilled, according to the present invention, by a spinning reel comprising an anti-reverse mechanism including teeth formed on a rotor mounted forwardly of a reel body or on an element rotatable with the rotor, a stopper engageable with the teeth to prevent the rotor from rotating in a line unwinding direction, and a switching member for switching the stopper between a position for engaging the teeth and a position retracted from the teeth; a one-way clutch mechanism of a rolling type for acting on the rotor or the element rotatable with the rotor to allow the rotor to rotate in a line winding direction; a brake mechanism operable, when a force is applied to the rotor to rotate the rotor in the line unwinding direction, to apply a braking force to rotation of the rotor through the one-way clutch mechanism while allowing the rotation until the stopper engages one of the teeth; and a release mechanism for canceling the braking force in response to an operation of the anti-reverse mechanism to retract the stopper from the teeth.

This construction has the following functions and effects:

When a tension of a fishing line is applied to the rotor and the element rotatable with the rotor in the line unwinding direction, the rolling type one-way clutch mechanism restrains rotation of the rotor and unwinding of the line. In the event of a strong tension of the fishing line, as when a large fish strikes, the brake mechanism slips to allow the rotor to rotate in the line unwinding direction while under the restraint imposed by the one-way clutch mechanism. Such rotation and unwinding of the line are subsequently stopped in a positive way by engagement between the teeth and stopper of the anti-reverse mechanism.

Thus, this invention uses the anti-reverse mechanism and rolling type one-way clutch mechanism, i.e. two mechanisms having different characteristics, for preventing, without producing play, the rotor from rotating in the line unwinding direction. The one-way clutch mechanism may have a relatively small capacity as in the prior art, and yet with little possibility of damage.

When the anti-reverse mechanism is operated by the switching member to place the stopper and teeth in the engageable position, the brake mechanism becomes operative to apply a braking force through the one-way clutch mechanism against backward rotation of the rotor. When the anti-reverse mechanism is operated by the switching member to place the stopper and teeth in the non-engageable position, the release mechanism renders the brake mechanism inoperative whereby no braking force is applied to forward or backward rotation of the rotor.

Thus, the invention provides a spinning reel which is compact while retaining the advantage of using a rolling type one-way clutch mechanism, and is capable of reliably preventing unwinding of a fishing line.

The brake mechanism is, switchable between operative position and inoperative position by operating the switching member. Switching of the brake mechanism requires no special control device nor a separate operation therefor.

The release mechanism provided for the brake mechanism has the following advantage over the construction without such mechanism (as disclosed in Japanese Utility Model Publication No. 55-38380, for example). With the braking force canceled, the rotor is reversible lightly. When a fish bites and pulls a bait, the rotor is rotatable without imparting a resistance, whereby the fish swallows the bait without suspicion. Thus, fishing results may be improved, with possibility of line twisting diminished, by the way now devised of unwinding the fishing line upon reversal of the rotor.

The anti-reverse mechanism may include gear-like teeth formed on a position inside the reel body of a transmission shaft for transmitting drive to the rotor from a handle attached to the reel body, and a stopper engageable with the teeth.

Where the anti-reverse mechanism includes gear-like teeth and a stopper, engagement between the gear-like teeth and stopper imparts a strong braking force. Such a strong braking force is effective against a great force not manageable with the one-way clutch mechanism alone. This construction provides the advantage of allowing the one-way clutch mechanism to be small.

The anti-reverse mechanism may include teeth formed on an inner wall of the rotor, and a stopper engageable with the teeth.

Numerous teeth may be formed on the inner wall of the rotor at the same intervals as when formed on the transmission shaft. This anti-reverse mechanism is capable of stopping the rotor in fine phases of rotation.

The one-way clutch mechanism may include rollers or balls mounted between an inner race and an outer race, the inner race being fixedly mounted on a transmission shaft for driving the rotor, the outer race including an engaging portion for receiving the braking force from the brake mechanism.

With this construction, reversal of the rotor is checked by the braking force of the brake mechanism applied to stop movement of the outer race, which in turn stops rotation of the inner race and transmission shaft. This one-way clutch mechanism is compact while retaining the necessary strength, compared with the case of being attached to the inner peripheral wall of the rotor.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

Spinning reels according to the present invention will be described in detail with reference to the drawings.

Figure 1:
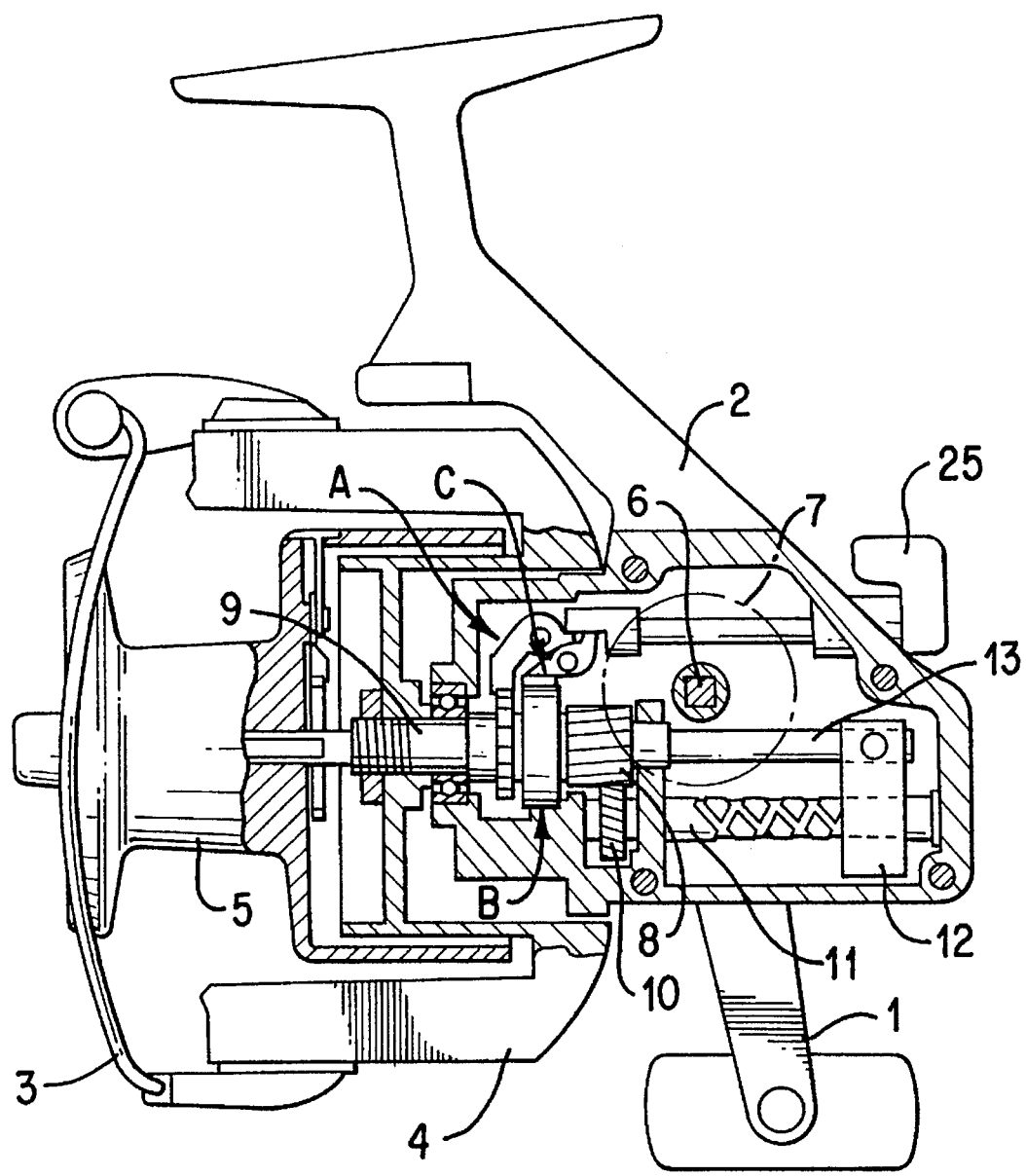
FIG. 1 is a side view in vertical section of a spinning reel.

FIG. 1 shows a spinning reel embodying the invention. This spinning reel includes a handle 1 attached to a reel body 2, a rotor 4 carrying a bail 3 and mounted on a forward portion of the reel body 2, and a spool 5 connected to the forward portion of the reel body 2. The spinning reel further includes a line winding drive system for driving the rotor 4. This drive system includes a handle shaft 6 connected to the handle 1, a drive gear 7 driven by the handle shaft 6, a pinion gear 8, and a sleeve shaft 9 (one example of drive shaft). The reel also includes a drive system having an oscillating mechanism with an input gear 10, a screw shaft 11 and a slider 12 for converting drive from the pinion gear 8 into a reciprocal motion for transmission to a spool shaft 13.

It is preferable that the bail 3 is formed of a shape memory alloy such as a titanium-nickel alloy for, when deformed by an external force, the bail 3 then could be heated to regain an original shape.

Figure 2:
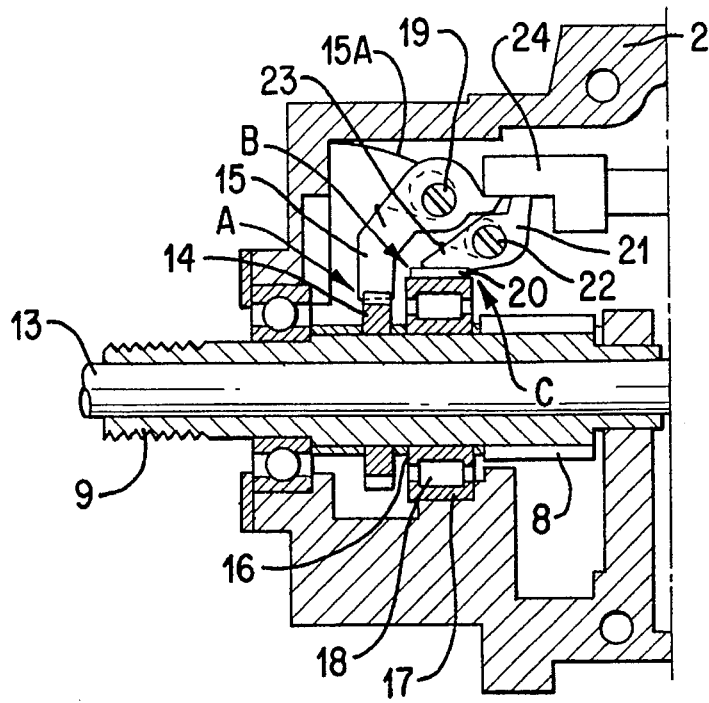
FIG. 2 is a side view in vertical section of an anti-reverse mechanism and a one-way clutch mechanism mounted on a sleeve shaft.
Figure 3A:
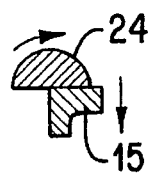
FIG. 3 is a front view in vertical section of the anti-reverse mechanism.
Figure 3:
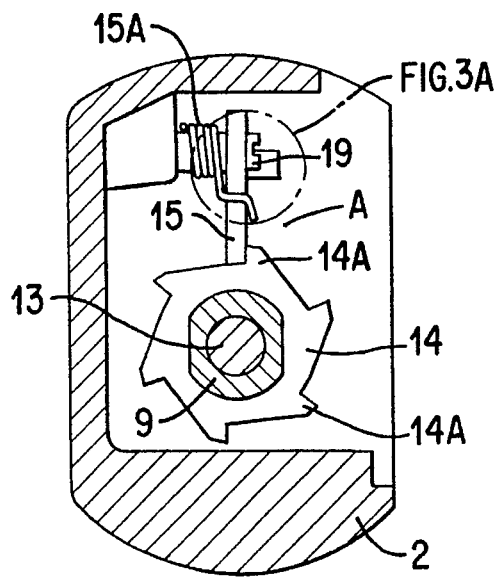
Figure 4:
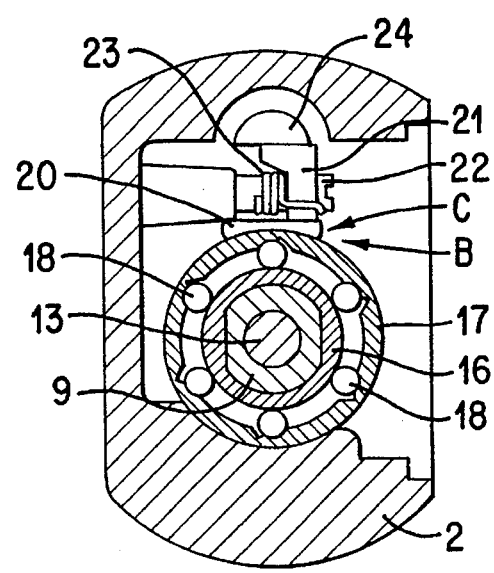
FIG. 4 is a front view in vertical section of the one-way clutch mechanism comprising a rolling type.

As shown in FIGS. 2 through 3, the sleeve shaft 9 supports a ratchet wheel type anti-reverse mechanism A and a rolling type (non-pawl type) one-way clutch mechanism B for preventing the rotor 4 from rotating in a direction to unwind a fishing line. The anti-reverse mechanism A includes a wheel 14 having teeth 14A, and a stopper 15 for engaging the teeth 14A. The one-way clutch mechanism B includes an inner race 16, an outer race 17 and rollers 18.

The wheel 14 of the anti-reverse mechanism A is fixedly mounted on the sleeve shaft 9 acting as a transmission shaft. The stopper 15 is supported by the reel body 2 to be pivotable about a first axis 19, and biased toward an engaging position by a spring 15A. The inner race 16 of the one-way clutch mechanism B is fixedly mounted on the sleeve shaft 9 to be rotatable therewith. The outer race 17 acting as a stationary member has a peripheral engaging portion. An arm 21 is supported by the reel body 2 to be pivotable about a second axis 22. The arm 21 includes a frictional retaining portion 20 for contacting the engaging portion to apply a frictional force against rotation of the outer race 17. A spring 23 is provided to act as a biasing member to cause the frictional retaining portion 20 to contact the peripheral engaging portion of the outer race 17. This construction forms a brake mechanism C. The stopper 15 and frictional retaining portion 20 are switchable to respective inoperative positions by a cam 24 which is controllable by a lever 25 extending outwardly of the reel body 2.

The cam 24 is rotatable in the direction of an arrow in FIG. 3 to depress rear ends of the stopper 15 and arm 21, thereby moving the stopper 15 away from the wheel 14, and the frictional retaining portion 20 away from the outer race 17. The spring 23 has a biasing force to cause the frictional retaining portion 20 to slip before a force from the sleeve shaft 9 reaches a critical level to damage the rolling type one-way clutch mechanism B.

As soon as a tension of the fishing line applies a force to rotate the sleeve shaft 9 in the direction to unwind the fishing line, the one-way clutch mechanism B restrains the sleeve shaft 9 and prevents unwinding of the fishing line. When a large fish gives a strike, for example, the one-way clutch mechanism B is first operable to prevent unwinding of the fishing line. Subsequently, the frictional retaining portion 20 slips to allow the sleeve shaft 9 to rotate in the line unwinding direction to avoid damage to the one-way clutch mechanism B. The stopper 15 of the anti-reverse mechanism A engages the ratchet wheel 14 to stop rotation of the sleeve shaft 9 and reliably prevent unwinding of the fishing line. The arm 21 is pivotable with a switching operation of the cam 24 to move between a position away from the outer race 17 of the one-way clutch mechanism B and a position to press on the outer race 17. Thus, the cam 24 acts as a release mechanism for canceling the braking force of the brake mechanism C.

A different embodiment will be described next.

Figure 5:
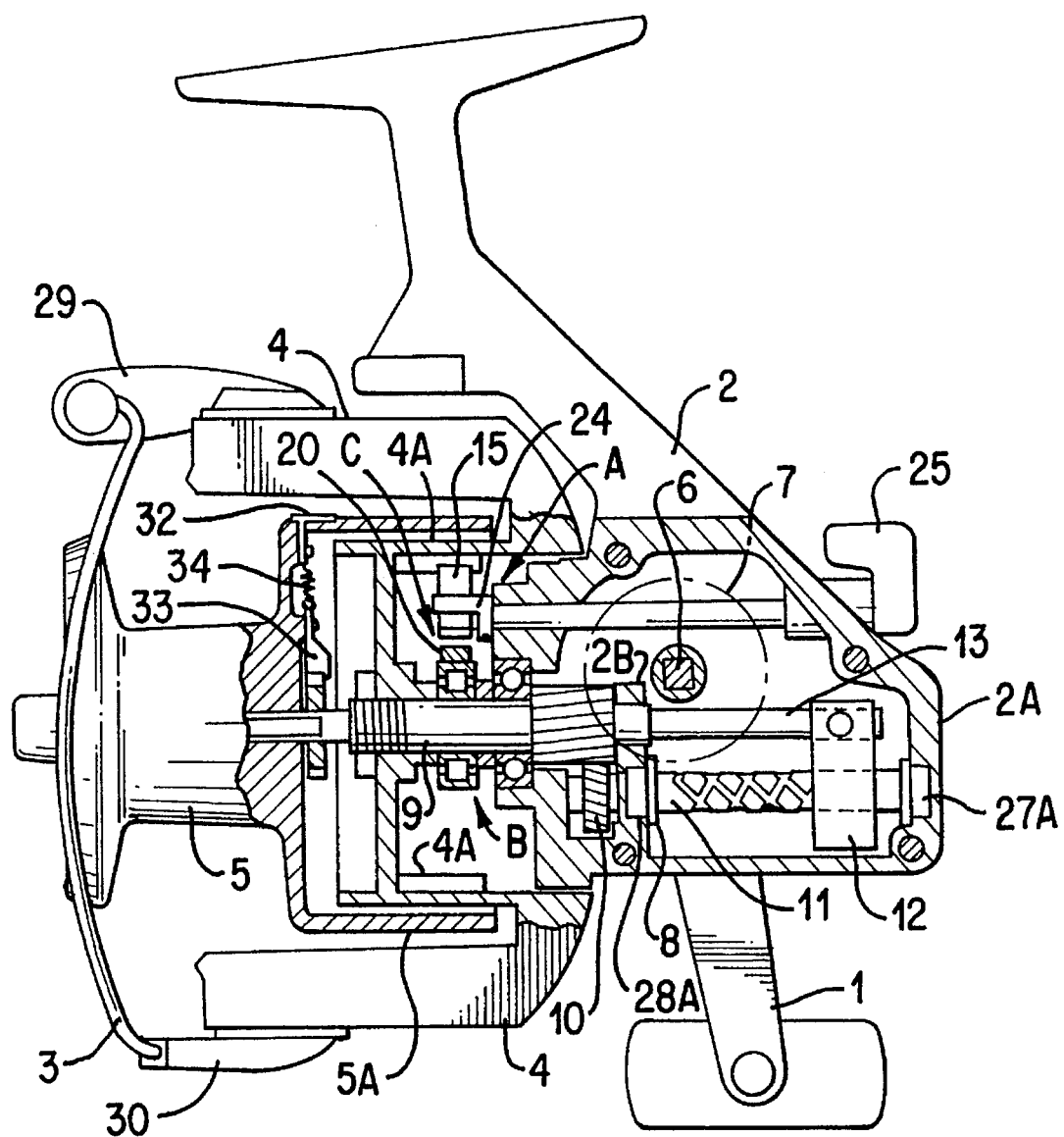
FIG. 5 is a side view in vertical section of a spinning reel having an anti-reverse mechanism in a different embodiment.
Figure 9:
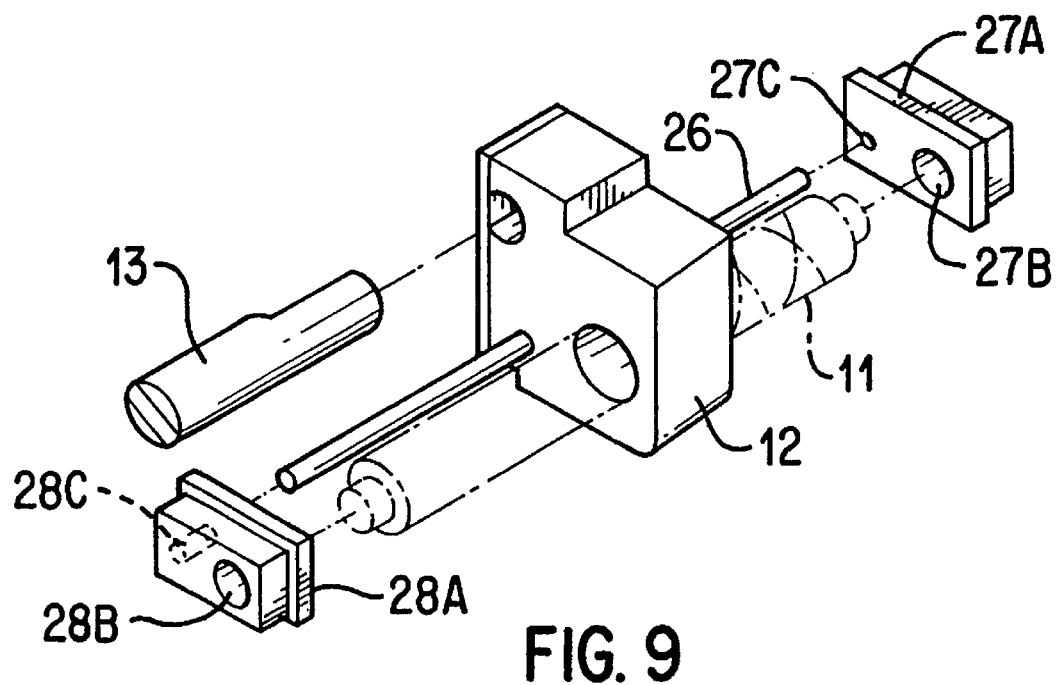
FIG. 9 is an exploded perspective view of a structure for supporting a screw shaft and a guide pin.

This reel includes an anti-reverse mechanism A having teeth 4A formed on an inner peripheral wall of a rotor 4. The construction of an oscillating mechanism will be described first. As shown in FIGS. 5 and 9, a guide pin 26 extends parallel to a screw shaft 11 for guiding a slider 12 meshed with the screw shaft 11 to be slidable with a spool shaft 13. The screw shaft 11 extends between a rear inner wall 2A and an intermediate vertical wall 2B of the reel body 2. The screw shaft 11 is supported by a rear bush 27A fitted in the rear inner wall 2A, and a front bush 28A fitted in the vertical wall 2B. As seen from FIG. 9, each of the front and rear bushes 28A and 27A defines a large hole 28B or 27B for receiving the screw shaft 11, and a small hole 28C or 27C for receiving the guide pin 26, whereby the shaft 11 and pin 26 are maintained parallel to each other.

Figure 10:
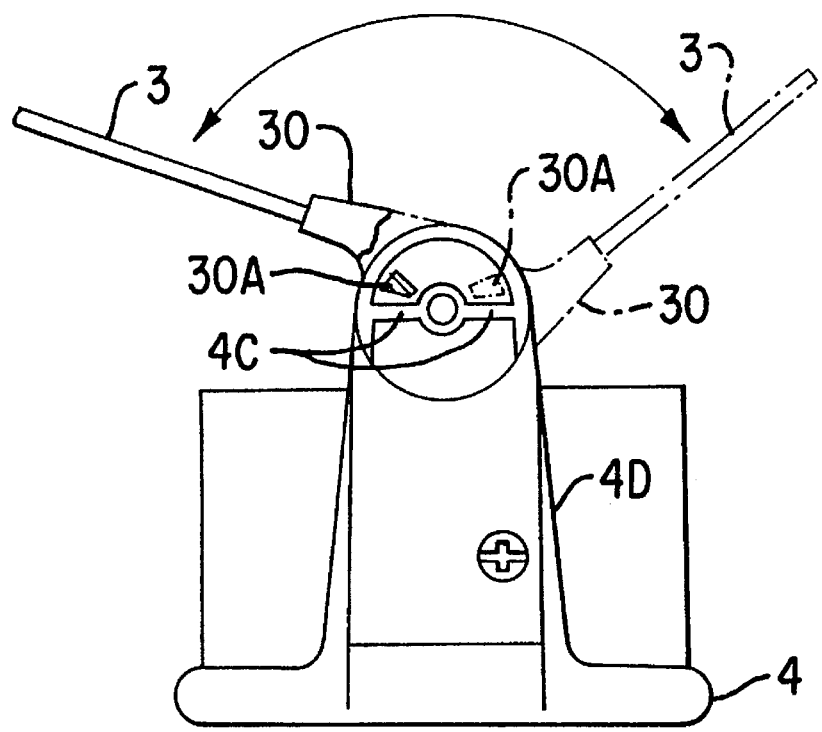
FIG. 10 is a fragmentary plan view showing limits of pivotal movement of a pivotal arm.

A bail 3 is pivotable between an open, line unwinding position and a closed, line winding position. An arm cam 29 and a pivotal arm 30 provide different limits for the pivotal movement of the bail 3. That is, the pivotal arm 30 provides a large pivoting angle than the arm cam 29. As shown in FIG. 10, the pivotal arm 30 includes a contact 30A for contacting an inner wall 4C of an arm 4D of the rotor 4. When the bail 4 is opened and the arm cam 29 reaches a limit of pivotal movement, the contact 30A of the pivotal arm 30 remains out of contact with the inner wall 4C of the arm 4D of the rotor 4. A roller of the arm cam 29 could be reversed if the contact 30A of the pivotal arm 30 contacted the inner wall 4C before the arm cam 29 reaches the limit of pivotal movement. However, the reversal of the roller is avoided since the arm cam 29 reaches the limit first.

Figure 11:
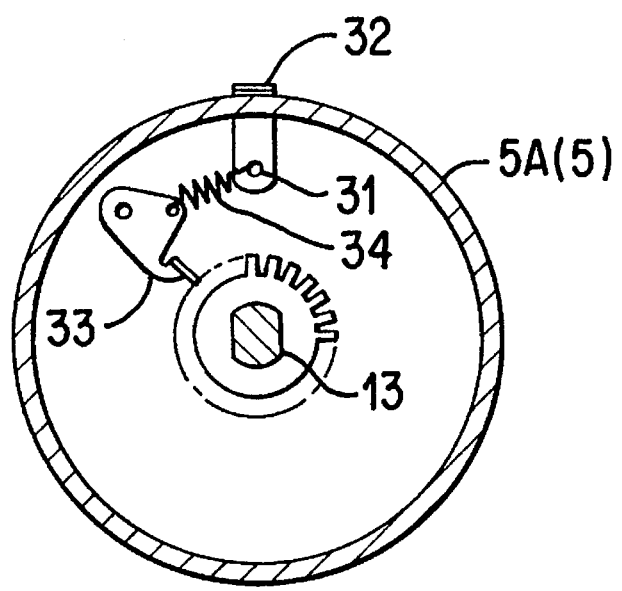
FIG. 11 is a rear view in vertical section of a structure for fixing a line holding guide plate.

As shown in FIG. 11, a support pin 31 is erected on an inner wall of a spool 5, and a line holding guide plate 32 extending to a skirt 5A of the spool 5 is rigidly caulked to the guide plate 32. An engaging element 33 is disposed adjacent the support pin 31 for producing a clicking sound. A spring 34 for biasing the engaging element 33 to a neutral position has one end thereof connected to the support pin 31. Thus, the support pin 31 acts as a mechanism for fixing the line holding guide plate 32 and for engaging one end of the spring 34.

The anti-reverse mechanism A, a one-way clutch mechanism B and a brake mechanism C will be described next.

Figure 6:
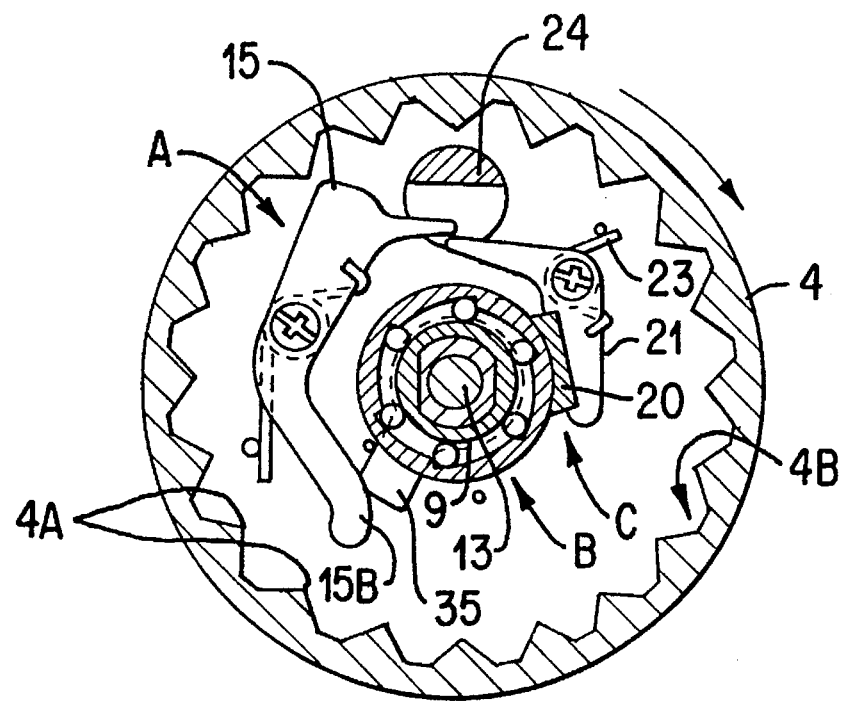
FIG. 6 is a front view in vertical section of a rotor in forward rotation with the anti-reverse mechanism in an operative position.

As shown in FIGS. 5 and 6, the one-way clutch mechanism B is mounted on a sleeve shaft 9. An arm 21 is provided which includes a frictional retaining portion 20 for acting on the one-way clutch mechanism B. The rotor 4 has a forwardly recessed space defined in a rear surface thereof, and engaging teeth 4A are formed equidistantly on a peripheral inner wall of the recessed space. The teeth 4A are engageable with a stopper 15. The stopper 15 and arm 21 are biased in engaging and friction applying directions.

Figure 7:
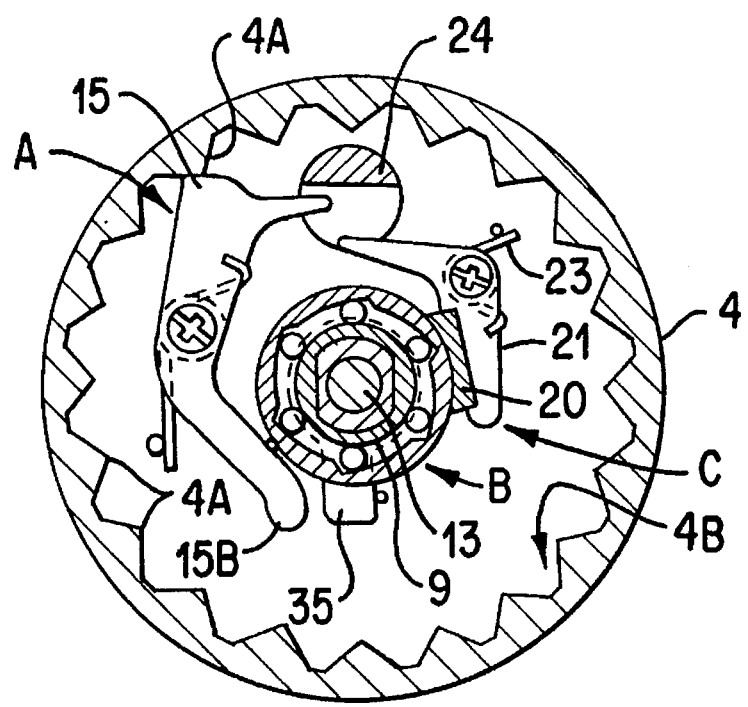
FIG. 7 is a front view in vertical section of the rotor prevented from rotating backward by the anti-reverse mechanism.
Figure 8:
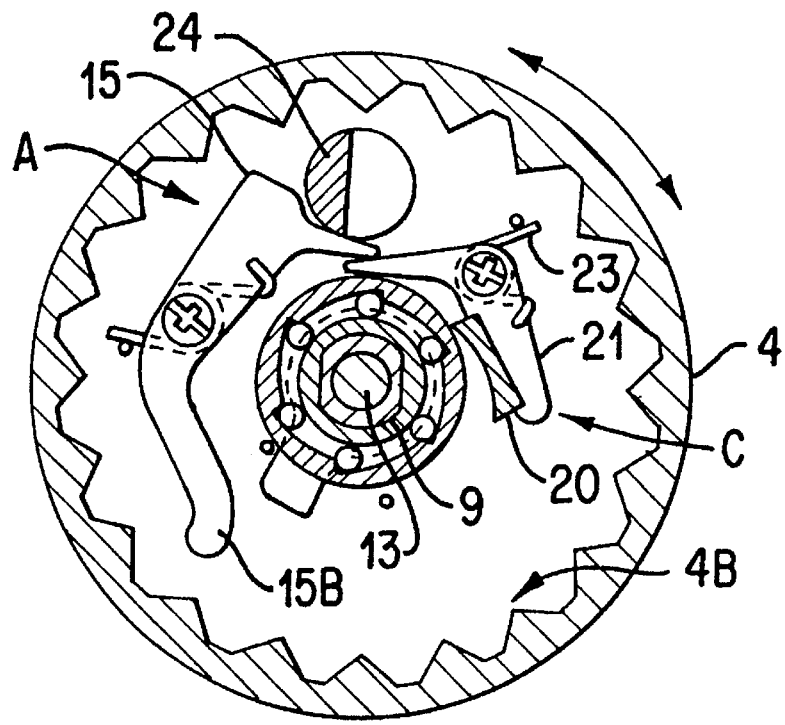
FIG. 8 is a front view in vertical section of the anti-reverse mechanism in an inoperative position.

With this construction, when a lever 25 is operated to set a cam 24 to a position not to act on the stopper 15 or arm 21, as shown in FIGS. 6 and 7, the stopper 15 and arm 21 become engageable under the forces of biasing springs. In this state, a cam 35 loosely mounted on the sleeve shaft 9 to be pivotable through a fixed angle lifts the other end 15B of the stopper 15 at a time of forward rotation, as shown in FIG. 6, thereby to switch the stopper 15 to an inoperative position. The arm 21 has the frictional retaining portion 20 in pressure contact. At a time of backward rotation, as shown in FIG. 7, the stopper 15 is engageable with the teeth 4A, while the arm 21 maintains the frictional retaining portion 20 in the pressure contact.

Other embodiments will be described hereinafter.

Figure 14:
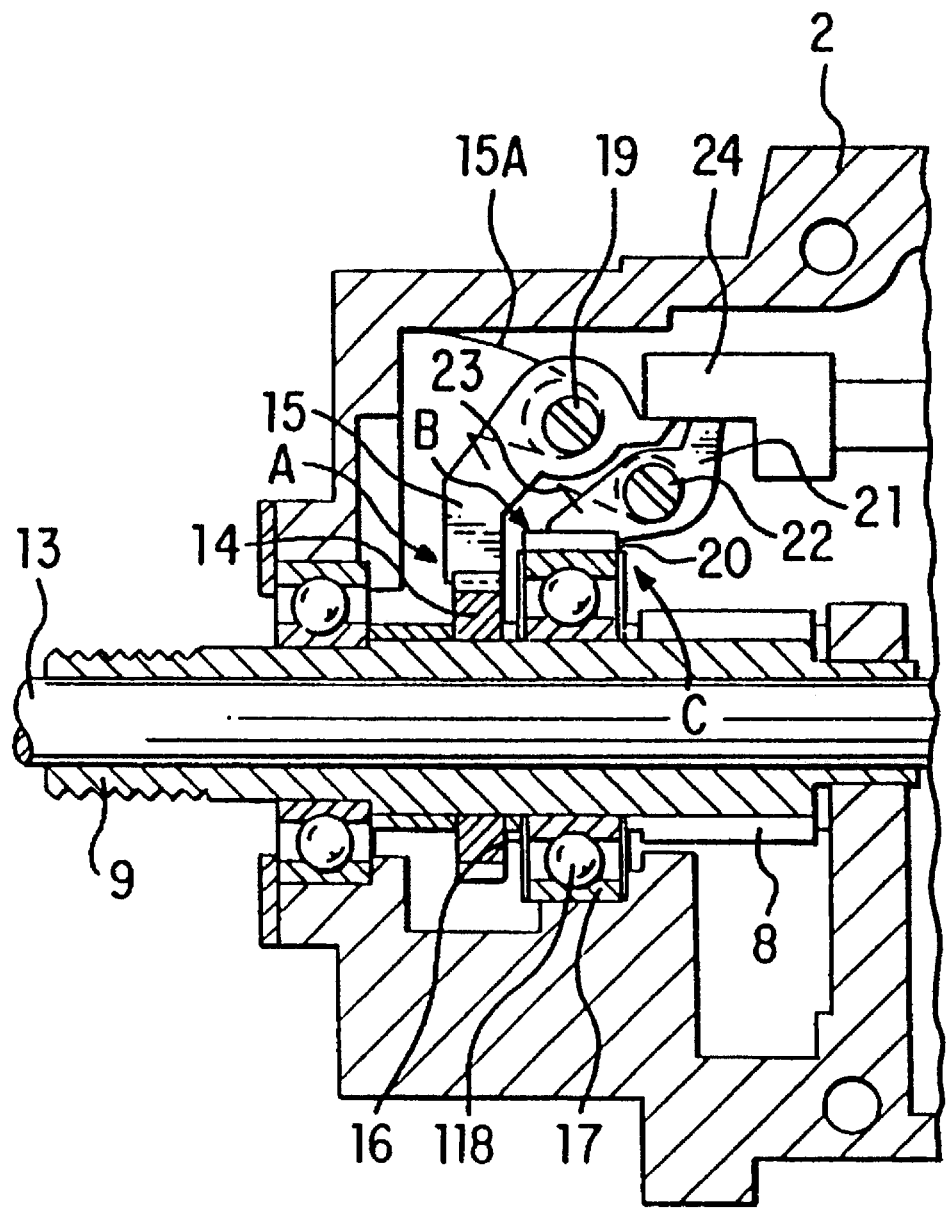
FIG. 14 is a side view in vertical section illustrating an alternate embodiment of the invention wherein a one-way clutch using balls is shown.

(a) In practicing the present invention, the rolling type one-way clutch mechanism B may employ balls 118, for example, as shown in FIG. 14. The one-way clutch mechanism B may have an outer race interlocked to the drive shaft, with the inner race acting as a stationary element.

(b) The anti-reverse mechanism A, one-way clutch mechanism B and brake mechanism C may be modified as follows.

Figure 12:
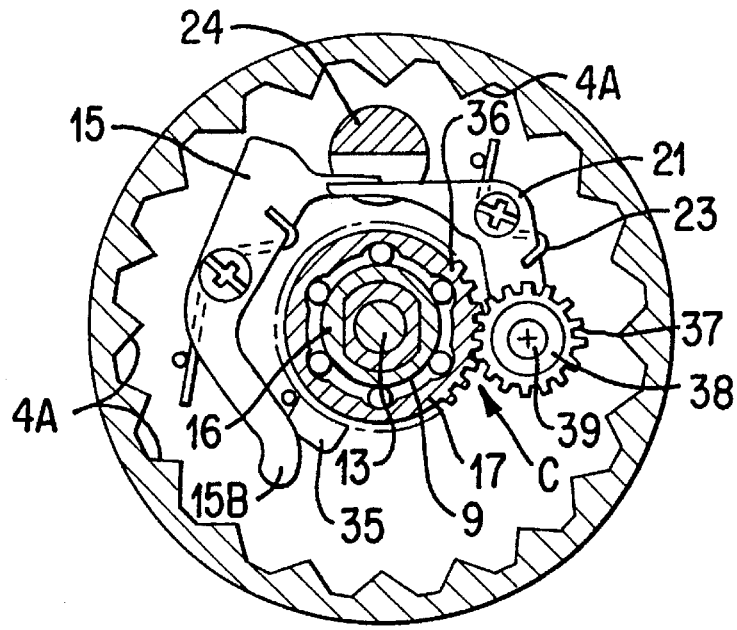
FIG. 12 is a front view of a brake mechanism in a further embodiment of the invention, with a rotor in forward rotation and an anti-reverse mechanism in an operative position.
Figure 13:
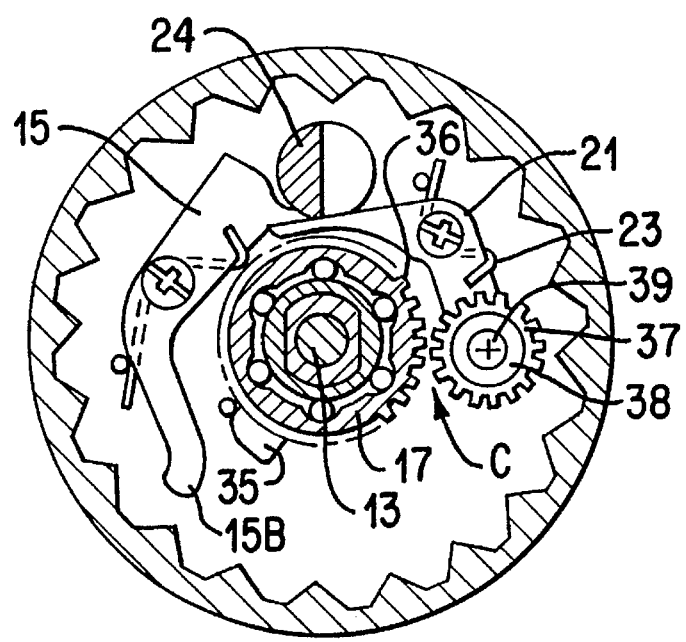
FIG. 13 is a front view in vertical section of the anti-reverse mechanism of FIG. 12 in an inoperative position.

Their basic constructions are the same as in FIG. 6, and only different points will be described. As shown in FIGS. 12 and 13, the one-way clutch mechanism B has an outer race 17 defining a gear 36, while an arm 21 rotatably supports a driven gear 37 engageable with the gear 36. A frictional brake ring 38 is interposed between the driven gear 37 and an axis supporting the driven gear 37. When the driven gear 37 in a braked state is meshed with the gear 36, the braking force is applied through the one-way clutch mechanism B to the sleeve shaft 9, thereby braking the rotor 4.

With this construction, the anti-reverse mechanism A and brake mechanism C are switchable with an operation of the cam 24.

What is claimed is:

1. A spinning reel comprising:

a reel body;

a rotor provided on said reel body, said rotor including a sleeve shaft rotatable with said rotor and a cylindrical portion surrounding said sleeve shaft;

an anti-reverse mechanism for preventing said rotor from rotating in a line unwinding direction, said anti-reverse mechanism including:
  engaging teeth defined on an inner surface of the cylindrical portion of said rotor along its inner periphery;
  an engaging pawl supported on said reel body, said pawl being displaceable between an operative position engageable with said engaging teeth and an inoperative position disengaged from said engaging teeth;

a brake mechanism for applying a braking force to said rotor in a line unwinding direction, said brake mechanism including a one-way clutch mechanism mounted on said sleeve shaft;

a selector mechanism for displacing said engaging pawl and operating said braking mechanism, said selector mechanism including a cam member switchable between a first mode and a second mode;

wherein said cam member places said engaging pawl in said operative position and operates said braking mechanism to apply a braking force in said first mode; and wherein said cam member places said engaging pawl in said inoperative position and operates said braking mechanism to remove said braking force in said second mode.

2. A spinning reel comprising:

a reel body;

a rotor provided on said reel body, said rotor including a sleeve shaft rotatable with said rotor and a cylindrical portion surrounding said sleeve shaft;

an anti-reverse mechanism for preventing said rotor from rotating in a line unwinding direction, said anti-reverse mechanism including:

engaging teeth defined on an inner surface of the cylindrical portion of said rotor along its inner periphery;

an engaging pawl supported on said reel body, said pawl being displaceable between an operative position engageable with said engaging teeth and an inoperative position disengaged from said engaging teeth;

a brake mechanism for applying a braking force to said rotor in a line unwinding direction, said brake mechanism including a one-way clutch mechanism mounted on said sleeve shaft;

a selector mechanism switchable between a first mode and a second mode, said selector mechanism when in said first mode placing said engaging pawl in said operative position and operating said brake mechanism to apply a braking force to rotation of said rotor, said selector mechanism when in said second mode placing said engaging pawl in said inoperative position and operating said brake mechanism to remove said braking force from being applied to the rotation of said rotor.

3. A spinning reel comprising:

a reel body;

a rotor provided on said reel body, said rotor including a sleeve shaft rotatable with said rotor;

an anti-reverse mechanism for preventing said rotor from rotating in a line unwinding direction, said anti-reverse mechanism including:

engaging teeth defined on an inner surface of said rotor along a periphery of said inner surface;

an engaging pawl supported on said reel body, said pawl being displaceable between an operative position engageable with said engaging teeth and an inoperative position disengaged from said engaging teeth;

a brake mechanism for applying a braking force to said rotor in a line unwinding direction, said brake mechanism including a one-way clutch mechanism mounted on said sleeve shaft;

a selector mechanism for displacing said engaging pawl and operating said braking mechanism, said selector mechanism including a cam member switchable between a first mode and a second mode;

wherein said cam member places said engaging pawl in said operative position and simultaneously operates said braking mechanism to apply a braking force in said first mode; and wherein said cam member places said engaging pawl in said inoperative position and simultaneously operates said braking mechanism to remove said braking force in said second mode.

4. A spinning reel as defined in claims claims 1, 2, or 3, wherein said one-way clutch mechanism includes an outer race, an inner race, and rolling bodies mounted between said outer race and said inner race, wherein said inner race is fixed on said sleeve shaft, and wherein said outer race includes an outer periphery to receive said braking force.

5. A spinning reel as defined in claim 4, wherein said brake mechanism further includes an arm having a frictional retaining portion for applying a frictional braking force to said outer race, and a biasing means for pressing said frictional retaining portion to said outer race.

6. A spinning reel as defined in claim 4, wherein said brake mechanism includes a first gear formed on an outer periphery of said outer race, and a pivotable arm provided with a driven gear, said pivotable arm being pivotable between an engaged position in which said driven gear is engaged with said first gear and a disengaged position in which said driven gear is disengaged therefrom, and said pivotable arm includes a brake means for applying a braking force to said driven gear.

7. A spinning reel as defined in claim 6, wherein said brake means includes a frictional brake ring interposed between said driven gear and a support shaft supporting said driven gear.

8. A spinning reel as defined in claim 4, wherein said brake mechanism includes rolling bodies in the form of rollers.

9. A spinning reel as defined in claim 4, wherein said brake mechanism includes rolling bodies in the form of balls.

10. A spinning reel as defined in claims 12, 20, or 21, wherein said selector mechanism is operable by a switching member disposed outwardly of said reel body.

11. A spinning reel comprising:

reel body;

a rotor provided on said reel body, said rotor including a sleeve shaft rotatable with said rotor;

an anti-reverse mechanism for preventing said rotor from rotating in a line unwinding direction, said anti-reverse mechanism including:

engaging teeth defined on an inner surface of said rotor along a periphery of said inner surface;

an engaging pawl supported on said reel body, said pawl being displaceable between an operative position engageable with said engaging teeth and an inoperative position disengaged from said engaging teeth;

a brake mechanism for applying a braking force to said rotor in a line unwinding direction, said brake mechanism including a one-way clutch mechanism mounted on said sleeve shaft;

a selector mechanism switchable between a first mode and a second mode, said selector mechanism when in said first mode placing said engaging pawl in said operative position and operating said brake mechanism to apply a braking force to rotation of said rotor, said selector mechanism when in said second mode placing said engaging pawl in said inoperative position and operating said brake mechanism to remove said braking force from being applied to the rotation of said rotor;

wherein said one-way clutch mechanism includes an outer race, an inner race, and rolling bodies mounted between said outer race and said inner race, wherein said inner race is fixed on said sleeve shaft, and wherein said outer race includes an outer periphery to receive said braking force; and wherein said brake mechanism further includes an arm having a frictional retaining portion for applying a frictional braking force to said outer race, and a biasing means for pressing said frictional retaining portion to said outer race.

* * * * *

UNITED STATES PATENT AND TRADEMARK OFFICE
CERTIFICATE OF CORRECTION

PATENT NO. : 5,586,734
DATED      : December 24, 1996
INVENTOR(S) : Kawabe et al.

It is certified that error appears in the above-identified patent and that said Letters Patent is hereby corrected as shown below:

In Column 8, line 37, "12, 20, or 21" should read —1, 2, or 3—.

Signed and Sealed this

First Day of April, 1997

Attest:

BRUCE LEHMAN

Attesting Officer

Commissioner of Patents and Trademarks